Figure 1:
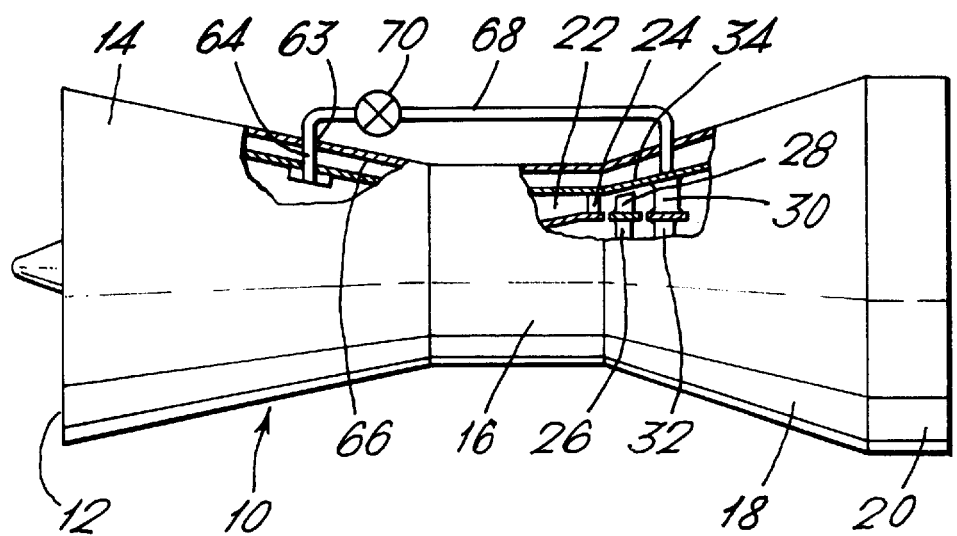

US005772400A

United States Patent [19]
Pellow

[11] Patent Number: 5,772,400
[45] Date of Patent: Jun. 30, 1998

[54] TURBOMACHINE

[75] Inventor: Terence R. Pellow, Bristol, England

[73] Assignee: Rolls-Royce PLC, London, England

[21] Appl. No.: 791,487

[22] Filed: Jan. 27, 1997

[30] Foreign Application Priority Data

Feb. 13, 1996 [GB] United Kingdom .................. 9602842

[51] Int. Cl.⁶ ..................................................... F04D 29/18
[52] U.S. Cl. ...................................... 415/173.1; 415/173.2
[58] Field of Search ............................. 415/173.1, 173.2, 415/173.3, 115, 116

[56] References Cited

U.S. PATENT DOCUMENTS

| 3,535,873 | 10/1970 | Szydlowski | 415/115 |
|---|---|---|---|
| 3,975,901 | 8/1976 | Hallinger et al. | 415/115 |
| 4,117,669 | 10/1978 | Heller | 415/115 |
| 5,044,881 | 9/1991 | Dodd et al. | 415/115 |
| 5,169,287 | 12/1992 | Proctor et al. | 415/115 |
| 5,525,032 | 6/1996 | Kreis et al. | 415/115 |

FOREIGN PATENT DOCUMENTS

| 288356-A1 | 10/1988 | European Pat. Off. . |
|---|---|---|
| 2267129 | 11/1993 | United Kingdom . |

*Primary Examiner*—John T. Kwon
*Attorney, Agent, or Firm*—Oliff & Berridge, PLC

[57] ABSTRACT

A gas turbine engine turbomachine (10) comprises a turbine section (18) in which cooling air is supplied from a compressor section (14) via a pipe (68) to a chamber (60). The chamber (60) supplies the cooling air through passages (58) in the nozzle guide vanes (30) to impinge upon a stator disc (32). A valve (70) in the pipe (68) is used to switch the flow of cooling air on and off. The valve (70) is opened to allow the cooling air to cool the stator disc (32) to shrink the stator disc (32) to minimise clearance between a shroud (34) supported by the nozzle guide vanes (30) and the turbine blades (28) during one mode of operation. The valve (70)is closed to allow the stator disc (32) to expand to increase the clearance between the shroud (34) and the turbine blades (28).

19 Claims, 2 Drawing Sheets

TURBOMACHINE

The present invention relates to turbomachines, particularly to gas turbine engines, more particularly to apparatus for controlling the clearance between rotor blades and a surrounding shroud of gas turbine engine compressors or rotors.

In order to increase the efficiency of turbomachines it is well known to maintain the closest possible clearance between the rotor blades and the surrounding shroud to ensure that very little of the working fluid passes through the clearance.

It is well known to have increased clearance between the rotor blades and the surrounding shroud to ensure that the rotor blades do not rub on the shroud during transient conditions or during violent manoeuvring of an aircraft to which the gas turbine engine is secured.

The present invention seeks to provide a turbomachine with novel apparatus for controlling the clearance between the rotor blades and a surrounding shroud.

Accordingly the present invention provides a turbomachine comprising a rotor having a plurality of radially extending rotor blades, a stator including a shroud, a stator disc and a plurality of stator vanes arranged in a first stage, the first stage of stator vanes extending radially from the stator disc, the shroud being arranged around and spaced radially from the rotor blades by a clearance, the shroud being supported from the first stage of stator vanes, means to supply a cooling or heating fluid onto the stator disc and valve means to control the supply of the cooling or heating fluid onto the stator disc to control the clearance between rotor blades and the shroud.

Preferably the stator disc and the first stage of stator vanes are located downstream of the rotor blades.

Preferably a first end of the shroud is cantilevered from the first stage of stator vanes.

Preferably a second end of the shroud is located between inner and outer radial stops to limit movement of the shroud.

Preferably the stops are arranged on an adjacent stage of stator vanes.

A first end of the shroud may be cantilevered from an adjacent stage of stator vanes.

Preferably the means to supply cooling or heating fluid comprises at least one passage extending radially through the first stage of stator vanes.

Preferably the means to supply cooling or heating fluid is arranged to impinge the cooling or heating fluid onto the stator disc.

Preferably the valve means comprises an on/off valve arranged to supply cooling or heating fluid in a first mode of operation and to terminate the supply of cooling or heating fluid in a second mode of operation.

Preferably the supply of cooling or heating fluid is a supply of cool fluid to cool the stator disc, the valve means is arranged to supply cool fluid to the stator disc to cool the stator disc to reduce the clearance between the shroud and the rotor blades during cruise and the valve means is arranged to terminate the supply of cooling fluid to the stator disc to increase the clearance between the shroud and the rotor blades during high speed operation of the turbomachine.

Preferably the turbomachine is a gas turbine engine.

The rotor may be a turbine motor and the stator may be a turbine stator.

The means to supply cooling or heating fluid may include bleed means to bleed fluid from the compressor of the gas turbine engine.

Figure 3:
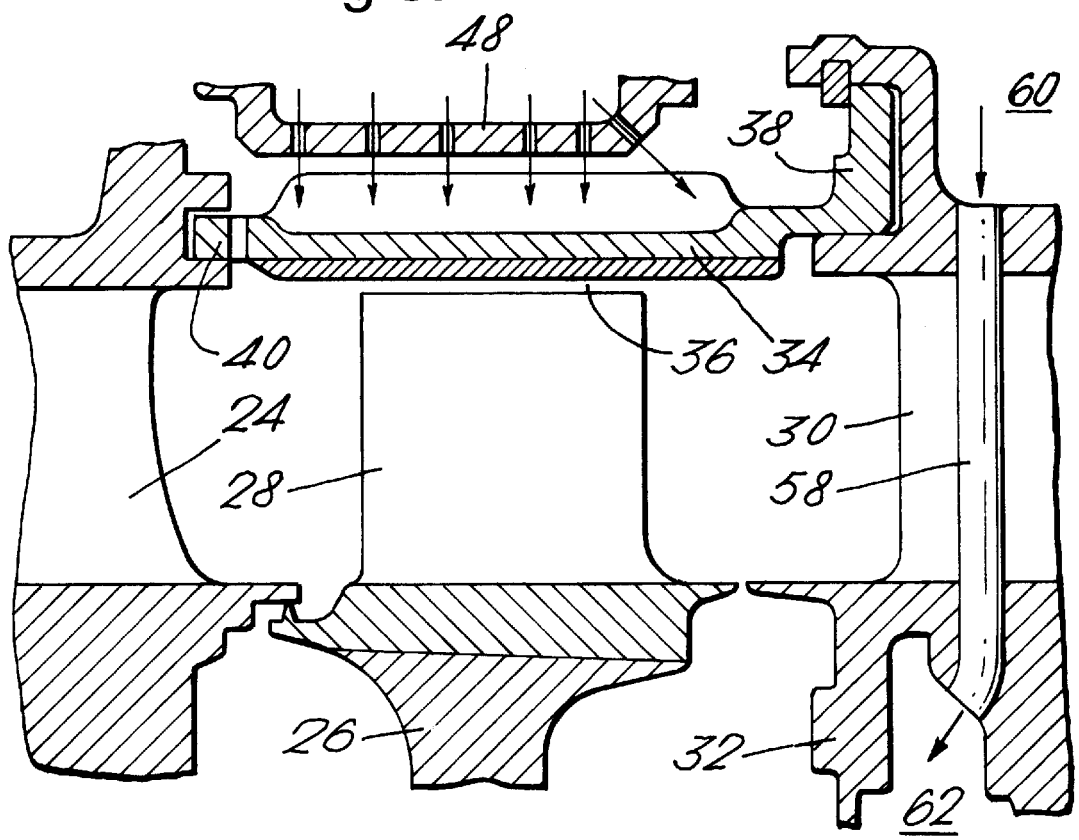
Figure 2:
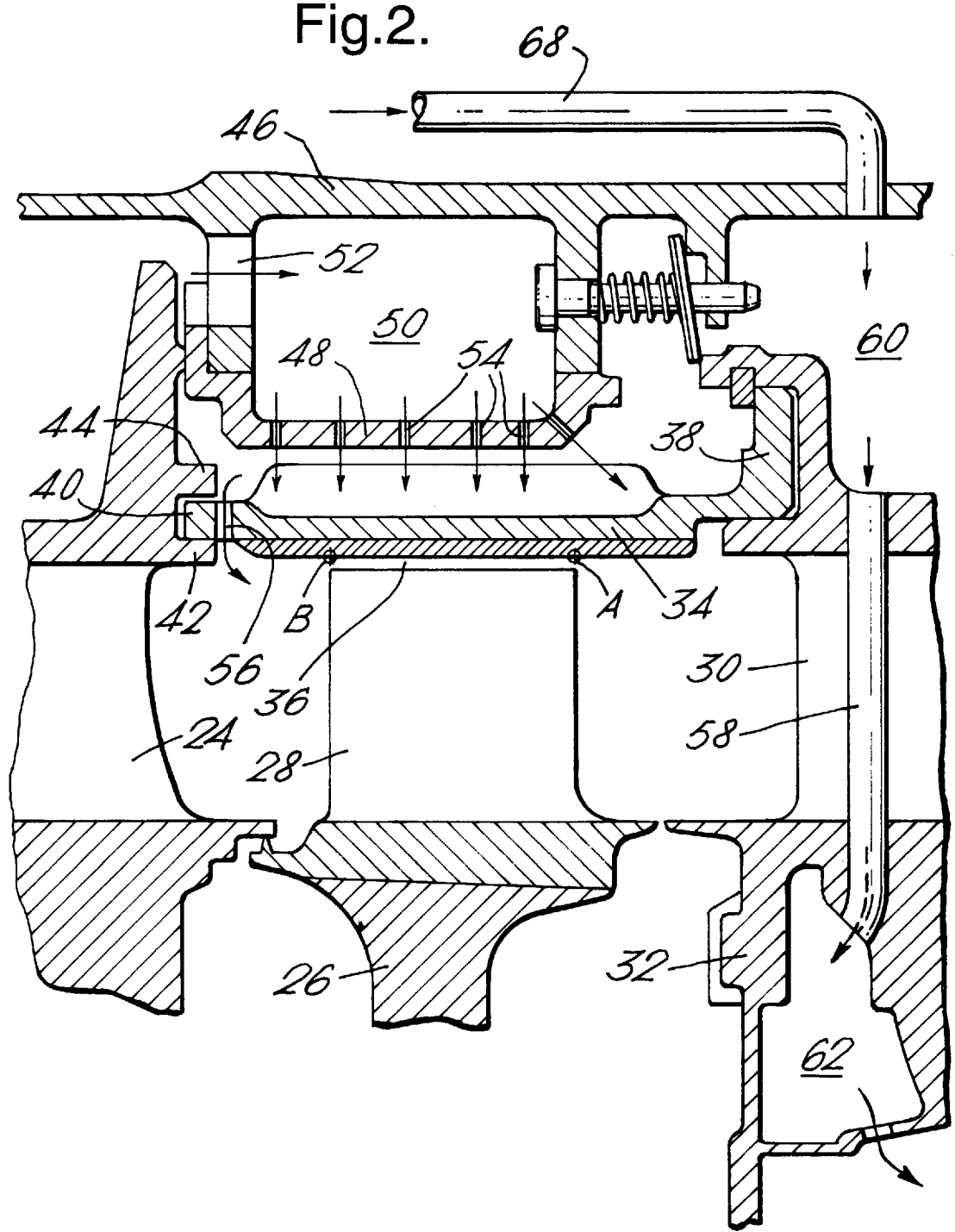

The present invention will be more fully described by way of example with reference to the accompanying drawings in which:

FIG. 1 is a partially cut away view of a gas turbine engine according to the present invention showing a turbine section, FIG. 2 is an enlarged cross-sectional view through the turbine section of the gas turbine engine shown in FIG. 1 and FIG. 3 is enlarged cross-sectional view through the turbine portion of the gas turbine engine of FIG. 1 showing an alternative embodiment.

A gas turbine engine turbomachine 10 is shown in FIG. 1 and comprises in flow series an intake 12, a compressor section 14, a combustion section 16, a turbine section 18 and an exhaust nozzle 20. The compressor section 14 is arranged to be driven by the turbine section 18 and the compressor section 14 may comprise one or more compressor rotors (not shown) driven by one or more turbine rotors 26 via shafts (not shown). The gas turbine engine 10 operates quite conventionally in that air is compressed as it flows through the compressor section 14 to the combustion section 16. Fuel is injected into a combustion chamber 22 in the combustion section 16 and is burnt in the air supplied by the compressor section 14 to produce hot gases. The hot gases flow out of the combustion section 16 through the turbine section 18 and exhaust nozzle 20 to atmosphere. The hot exhaust gases drive the turbine section 18 which in turn drives the compressor section 14.

The turbine section 18 includes a stage of high pressure nozzle guide vanes 24 between which the hot exhaust gases from combustion chamber 22 flow to the turbine section. A high pressure turbine motor 26 is located downstream of the high pressure nozzle guide vanes 24, and the high pressure turbine rotor 26 carries a plurality of circumferentially arranged, radially extending turbine blades 28. Downstream of the turbine blades 28 is located a stage of low pressure nozzle guide vanes 30, arranged circumferentially around and extending radially from a low pressure stator disc 32. A shroud 34 is arranged around and spaced from the tips of the high pressure turbine blades 28 by a clearance 36. The downstream end 38 of shroud 34 is cantilevered from the low pressure nozzle guide vanes 30 while its upstream end 40 of the shroud 34 is located between two radial stops, radial inner stop 42 and radial outer stop 44 on the high pressure nozzle guide vanes 24.

A casing 46 encircles the nozzle guide vanes 24 and 34 and the shroud 34, and together with a member 48 defines an annular chamber 50 which receives cooling air via supply apertures 52. The member 48, located immediately surrounding the shroud 34, is provided with a plurality of holes 54 to allow air within the chamber 50 to be expelled in the direction of the shroud 34 to provide impingement cooling of the shroud 34. Used impingement cooling air flows through further apertures 56 in the shroud 34 into the gas stream flowing through the turbine section 18.

The low pressure nozzle guide vanes 30 are provided with one or more passages 58 which extend radially through the low pressure nozzle guide vanes 30. These passages interconnect a chamber 60 defined between the casing 46 and the low pressure nozzle guide vanes 30 with a chamber 62 defined between the stator disc 32 and the low pressure nozzle guide vanes 30.

The chamber 60 is connected to a bleed device 62 on the compressor section 14 of the gas turbine engine 10. The bleed device 62 comprises a plurality of apertures 64 in the casing 66 of the compressor section 14 thereby allowing air at a suitable pressure and temperature to be bled from the compressor section 14. This air is supplied to the chamber 60 via a pipe 68 and a valve 70.

The passages 58 in the low pressure nozzle guide vanes 30 are preferably arranged to discharge the cooling air from the compressor section 14 such that it impinges directly upon the stator disc 32 for maximum cooling effect, ie at 90° to the stator disc surface. Alternatively the cooling air from the passages 58 may be directed to flow along the surface of the stator disc 32 in a radially inward direction.

The valve 70 is a two-position on/off valve and preferably is operated by the engine or an aircraft control system. For example the rate of change of throttle, fuel flow, or other aircraft control demand is monitored and used to change the state of the valve 70. Alternatively the pilot could switch the position of the valve 70.

In operation, for maximum fuel efficiency, the valve 70 is opened to allow cooling air to be bled from the compressor section 14 through the pipe 68 to the chamber 60. The cooling air then flows from chamber 60 through the passages 58 in the low pressure nozzle guide vanes 30 into the chamber 62. Cooling air discharged from the passages 58 is directed against, or over, the stator disc 32, cooling it and reducing its diameter, which in turn causes the low pressure nozzle guide vanes 30 to be moved radially inwardly. This radial inward movement of the low pressure nozzle guide vanes 30 causes the shroud 34 to move radially inwards thereby reducing the clearance 36 between the shroud 34 and the rotor blade 28 tips. The valve 70 is operated for example during cruise conditions of an aircraft when the speed of rotation of the engine remains relatively constant.

For reducing the possibility of tip rubs between the turbine blade 28 tips and the shroud 34, the valve 70 is closed to prevent cooling air flowing from the compressor section 14 to cool the stator disc 32. The hotter stator disc 32 increases in diameter with corresponding radial outward movements of the low pressure nozzle guide vanes 30 and shroud 34 to increase the clearance 36 between the shroud 34 and the rotor blade 28 tips. The valve 70 is closed for example during transient conditions and violent manoeuvring of the aircraft.

For example with a cooling flow of air to the arrangement shown in FIG. 2 it is expected that this will provide a 0.4 mm reduction in diameter of the stator disc 32, a 0.5 mm reduction in clearance at the trailing edge of the turbine blade at point A, and a 0.59 mm reduction in clearance at the leading edge of the turbine blade at point B. This gives most movement at the leading edge of the turbine blade 28.

In FIG. 3 the shroud 34 is cantilevered from its upstream 40 on the high pressure nozzle guide vanes 24 giving most movement at the trailing edge of the turbine blade 28.

The shroud may be cantilevered from the low pressure nozzle guide vanes or high pressure nozzle guide vanes by suspending the shroud from the mid section of a lever pivoted on the high pressure nozzle guide vanes or low pressure nozzle guide vanes. This would ensure that the clearance changed uniformly at all points between the shroud and rotor blades.

Although the invention has been described with reference to gas turbine engines it may be equally applicable to other turbomachines. The invention may also be applicable to compressors of gas turbine engines, and it may be possible to supply hot air or fluid to the stator disc to increase the clearance to prevent rubs and not to supply hot air during cruise conditions.

I claim:

1. A turbomachine comprising a rotor having a plurality of radially extending rotor blades, a stator including a shroud, a stator disc and a plurality of stator vanes arranged in a first stage, the first stage of stator vanes extending radially from the stator disc, the shroud being arranged around and spaced radially from the rotor blades by a clearance, the shroud being moveably supported from the first stage of stator vanes, and fluid supply means to supply one of a cooling fluid and a heating fluid onto the stator disc to selectively change a size of the clearance between the rotor blades and the shroud.

2. A turbomachine as claimed in claim 1 in which the fluid supply means comprises at least one passage extending radially through the first stage of stator vanes.

3. A turbomachine as claimed in claim 2 in which the fluid supply means is arranged to direct the fluid against the outer surface of the stator disc.

4. A turbomachine as claimed in claim 1 further comprising valve means to control a supply of the fluid, the valve means including an on/off valve arranged to supply the fluid in a first mode of operation and to terminate the supply of fluid in a second mode of operation.

5. A turbomachine as claimed in claim 1 further comprising valve means to control a supply of the fluid, in which:

the fluid is cooling fluid;

the valve means is arranged to supply the fluid to the stator disc to cool the stator disc to reduce the size of the clearance between the shroud and the rotor blades during cruise; and the valve means is arranged to terminate the supply of cooling fluid to the stator disc to increase the size of the clearance between the shroud and the rotor blades during high speed operation of the turbomachine.

6. A turbomachine as claimed in claim 1 in which the turbomachine is a gas turbine engine.

7. A turbomachine as claimed in claim 6 in which the rotor is a turbine rotor and the stator is a turbine stator.

8. A turbomachine as claimed in claim 7 in which the fluid supply means includes bleed means to bleed fluid from a compressor of the gas turbine engine.

9. A turbomachine comprising:

a rotor having a plurality of radially extending rotor blades, a stator including a shroud, a stator disc and a plurality of stator vanes arranged in a first stage, the first stage of stator vanes extending radially from the stator disc, the shroud being arranged around and spaced radially from the rotor blades by a clearance, the shroud being supported from the first stage of stator vanes; and fluid supply means to supply one of a cooling fluid and a heating fluid onto the stator disc and valve means to control the supply of the cooling or heating fluid onto the stator disc to control the clearance between the rotor blades and the shroud, in which the stator disc and the first stage of stator vanes are located downstream of the rotor blades, a first end of the shroud is cantilevered from the first stage of stator vanes, and a second end of the shroud is located between inner and outer radial stops to limit movement of the shroud.

10. A turbomachine as claimed in claim 9 in which the stops are arranged on a first adjacent stage of stator vanes.

11. In a turbomachine comprising a rotor having a plurality of radially extending rotor blades and a stator including a shroud, a stator disc, and a plurality of stator vanes arranged in a first stage and extending radially from the stator disc, a method for controlling a size of a clearance between the rotor blades and the shroud, including:

moveably supporting the shroud from the first stage of stator vanes so that the shroud is arranged around the rotor blades and radially spaced from the rotor blades by a clearance; and selectively changing the size of the clearance between the rotor blades and the shroud by supplying one of a cooling fluid and a heating fluid to the stator disc.

12. The method of claim 11, further including:

locating the stator disc and the first stage of stator vanes downstream of the rotor blades;

cantilevering a first end of the shroud from the first stage of stator vanes; and positioning a second end of the shroud between inner and outer radial stops to limit movement of the shroud.

13. The method of claim 12, further including arranging the stops on a first adjacent stage of stator vanes.

14. The method of claim 13, further including cantilevering the first end of the shroud from a second adjacent stage of stator vanes opposite the first stage.

15. The method of claim 11, wherein supplying the fluid to the stator disc includes passing the fluid through at least one passage extending radially through the first stage of stator vanes.

16. The method of claim 11, wherein supplying the fluid to the stator disc includes directing the fluid against the outer surface of the stator disc.

17. The method of claim 11, in which supplying the fluid to the stator disc is performed in a first mode of operation, and further comprising terminating the supply of fluid to the stator disc in a second mode of operation.

18. The method of claim 17, wherein:

the fluid is cooling fluid;

the first mode of operation is cruise operation of the turbomachine; and the second mode of operation is high speed operation of the turbo-machine.

19. In a gas turbine engine comprising a rotor having a plurality of radially extending rotor blades and a stator including a shroud, a stator disc, and a plurality of stator vanes arranged in a first stage and extending radially from the stator disc, a method for controlling a size of a clearance between the rotor blades and the shroud, including:

moveably supporting the shroud from the first stage of stator vanes so that the shroud is arranged around the rotor blades and radially spaced from the rotor blades by a clearance; and selectively changing the size of the clearance between the rotor blades and the shroud by directing a supply of one of a cooling fluid and a heating fluid onto the outer surface of the stator disc in a first mode of operation and terminating the supply of the fluid onto the stator disc in a second mode of operation.

\* \* \* \* \*